US 9,058,267 B2

(12) United States Patent
Smith

(10) Patent No.: US 9,058,267 B2
(45) Date of Patent: Jun. 16, 2015

(54) I/O PATH SELECTION

(71) Applicant: LSI CORPORATION, San Jose, CA (US)

(72) Inventor: Gerald E. Smith, Longmont, CO (US)

(73) Assignee: Avago Technologies General IP Singapore) Pte Ltd, Singapore (SG)

( * ) Notice: Subject to any disclaimer, the term of this patent is extended or adjusted under 35 U.S.C. 154(b) by 234 days.

(21) Appl. No.: 13/927,305

(22) Filed: Jun. 26, 2013

(65) Prior Publication Data

US 2014/0365746 A1 Dec. 11, 2014

Related U.S. Application Data

(60) Provisional application No. 61/833,548, filed on Jun. 11, 2013.

(51) Int. Cl.
*G06F 12/10* (2006.01)
*G06F 12/08* (2006.01)
*G06F 12/02* (2006.01)

(52) U.S. Cl.
CPC ............... *G06F 12/08* (2013.01); *G06F 12/10* (2013.01); *G06F 12/0292* (2013.01)

(58) Field of Classification Search
None
See application file for complete search history.

(56) References Cited

U.S. PATENT DOCUMENTS

| 6,986,015 B2 | 1/2006 | Testardi |
| 8,370,447 B2 | 2/2013 | Benner et al. |
| 8,412,904 B2 | 4/2013 | Flynn et al. |
| 8,433,882 B2 | 4/2013 | Kurashige et al. |

*Primary Examiner* — Duc Doan
(74) *Attorney, Agent, or Firm* — Duft Bornsen & Fettig LLP

(57) ABSTRACT

A map of storage locations that indicates storage locations associated whose associated I/O transactions are to be processed by firmware running on a storage controller is maintained. The map is communicated to a storage controller driver. The storage controller driver receives a first I/O transaction request. Based on the map, and the storage location to be accessed by the first I/O transaction request, the first I/O transaction request is sent to a storage device without further processing by the firmware running on the storage controller. The storage controller driver receives a second I/O transaction request. Based on the map and the location to be accessed by the second I/O transaction request, the second I/O transaction request is sent for further processing by the firmware running on the storage controller.

20 Claims, 4 Drawing Sheets

I/O PATH SELECTION

BACKGROUND OF THE INVENTION

All or most of the components of a computer or other electronic system may be integrated into a single integrated circuit (chip). The chip may contain various combinations of digital, analog, mixed-signal, and radio-frequency functions. These integrated circuits may be referred to as a system-on-a-chip (SoC or SOC). A typical application is in the area of embedded systems. A variant of a system on a chip is the integration of many RAID functions on a single chip. This may be referred to as RAID on a chip (ROC).

RAID arrays may be configured in ways that provide redundancy and error recovery without any loss of data. RAID arrays may also be configured to increase read and write performance by allowing data to be read or written simultaneously to multiple disk drives. RAID arrays may also be configured to allow "hot-swapping" which allows a failed disk to be replaced without interrupting the storage services of the array. The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of operating a storage system, comprising: maintaining a map of storage locations that indicates a plurality of storage locations associated with I/O transactions that are to be processed by firmware running on a storage controller; communicating the map to a storage controller driver; receiving, by the storage controller driver, a first I/O transaction request; and, based on the map and a first storage location to be accessed by the first I/O transaction request, sending the first I/O transaction request to a storage device without further processing by the firmware running on the storage controller.

An embodiment of the invention may therefore further comprise a storage system comprising: a storage controller coupled to the host system to receive storage I/O requests, the storage controller configured to maintain a map of storage locations, the map indicating a plurality of storage locations associated with I/O transactions that are to be processed by firmware running on the storage controller; shared memory configured to communicate the map to the storage controller driver; and, a storage controller driver running on a host system, the storage controller driver configured to receive a first I/O transaction request, and, based on the map and a first storage location associated with the first I/O transaction request, send the first I/O transaction request to a storage device without further processing by the firmware running on the storage controller.

DETAILED DESCRIPTION OF THE EMBODIMENTS

Figure 1:
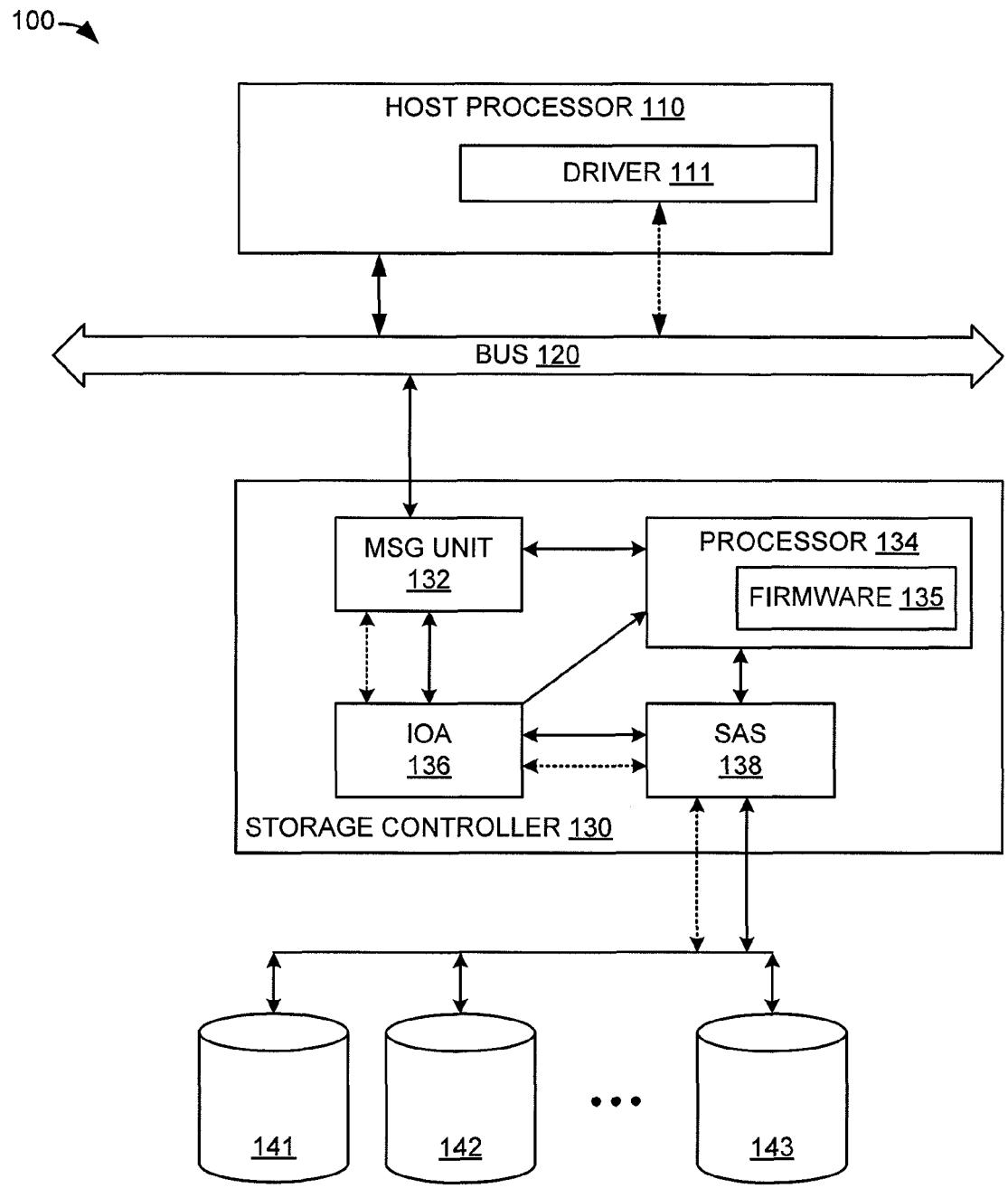
FIG. 1 is a block diagram illustrating a storage system.

FIG. 1 is a block diagram illustrating a storage system. In FIG. 1, storage system 100 comprises host processor 110, bus 120, storage controller 130, and storage devices 141-143. Host processor 110 includes driver 111. Storage controller 130 includes message unit 132, processor 134, I/O accelerator (IOA) 136, and serial attached SCSI (SAS) interface 138. Processor 134 includes firmware 135.

Host processor 110 is operatively coupled to bus 120. Bus 120 may be, for example, a PCIe bus. Bus 120 is operatively coupled to storage controller 130. Storage controller 130 may be, or include, a RAID controller. Message unit 132 is operatively coupled to processor 134 and I/O accelerator 136. I/O accelerator 136 is operatively coupled to SAS interface 138 and processor 134. Processor 134 is operatively coupled to SAS interface 138. SAS interface 138 is operatively coupled to storage devices 141-143. Storage devices 141-143 may be, for example, physical disk drives, solid-state disk drives, or a combination thereof.

Host processor runs (executes) driver 111. Processor 134 runs firmware 135. Driver 111 and firmware 135 may cooperate to provide storage and/or RAID functionality to host processor 110. For example, host processor 110 may access one or more of storage devices 141-143 via storage controller 130 using driver 111. Storage devices 141-143 may be configured by storage controller 130 by running firmware 135. Storage controller 130 may operate one or more of storage devices 141-143 as a RAID array. Storage controller 130 may operate one or more of storage devices 141-143 to appear to host process 100 as one or more virtual volumes (a.k.a., virtual disks).

In an embodiment, storage controller 130 can support multiple paths for I/O transactions to proceed to/from host processor 110 to/from storage devices 141-143. Some of these paths may have higher performance than others. For example, message unit 132 may be configured to receive an I/O transaction request from host processor 110 via bus 120. Message unit 132 may process this I/O transaction request and then pass the I/O transaction request to processor 134 for further processing. This further processing may be controlled and/or instructed by firmware 135. This further processing may be or include processing to implement a RAID level on storage devices 141-143. This further processing may be or include processing to implement caching of data stored on one or more of storage devices 141-143. Caching strategies that may be implemented are, for example, writeback, write-through, etc. RAID levels that may be implemented include, for example, RAID levels 0-6 (and combinations thereof), etc.

Figure 2:
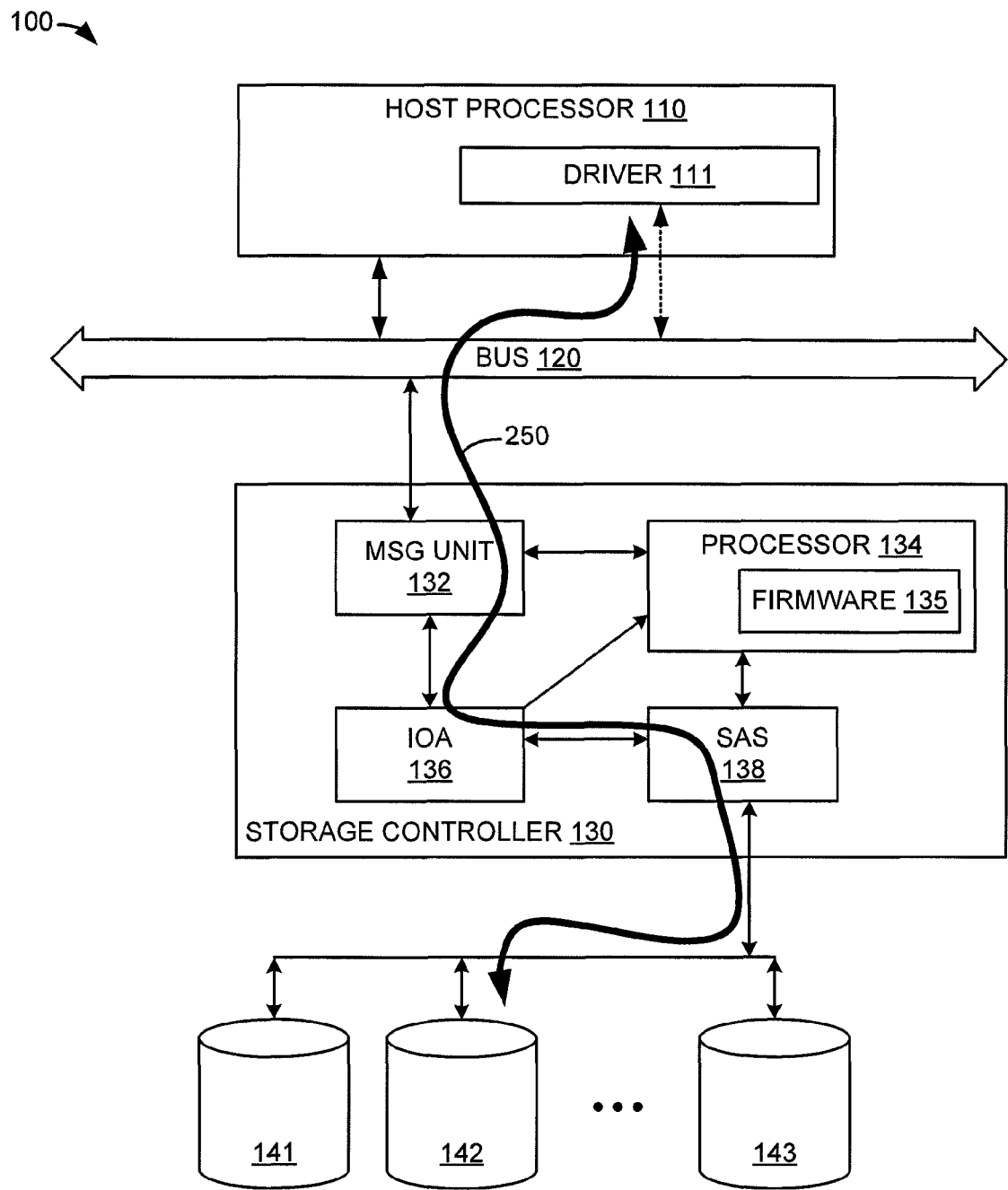
FIG. 2 is an illustration of an I/O path.

In an embodiment, message unit 132 may be configured to receive I/O transaction requests from host processor 110 via bus 120 and pass these I/O requests to I/O accelerator 136 and then on to SAS interface 138 for passing to storage devices 141-143 without further processing by processor 134 and/or firmware 135. Message unit 132 and/or I/O accelerator 136 may be configured by driver 111 pass I/O transaction requests directly to storage devices 141-143 without further processing by processor 134 and/or firmware 135. Sending I/O transactions directly to storage devices 141-143 without processing by processor 134 provides a high performance I/O transaction path from host 110 to storage devices 141-143. Arrow 250 in FIG. 2 illustrates a high performance I/O transaction path that does not involve further processing of an I/O transaction request by processor 134 and/or firmware 135.

In an embodiment, storage controller 130 is coupled to host processor 110 to receive storage I/O requests. Storage controller 130 is configured to maintain a map of storage locations. This map indicates storage locations that are associated with I/O transactions that are to be processed by firmware 135 running on storage controller 130. Driver 111 and/or host processor 110 configures an allocation of shared memory. This allocation is configured in order to communicate the map from firmware 135 to driver 111. Driver 111 is configured to receive a first I/O transaction request. Based on the map, and a first storage location associated with the first I/O transaction request, driver 111 can send the first I/O transaction request to a storage device 141-143 without further processing by the firmware 135.

Driver 111 can be further configured to receive a second I/O transaction request. Based on the map and a second storage location associated with the second I/O transaction request, driver 111 can send the second I/O transaction request for further processing by firmware 135.

In an embodiment, the map is stored in memory shared by firmware 135 and driver 111. The map of storage locations can be indexed by a hash key based on a logical block address (LBA) associated with the storage locations that are to be processed by firmware 135. The map of storage locations can be indexed by a hash key based on LBAs that are not to be processed by firmware 135. The map can be stored as a bitmap table. The map can be stored as a list.

In an embodiment, driver 111 establishes a shared memory area where firmware 135 running on processor 134 can communicate which I/O transactions should be processed by processor 134 and firmware 135 as opposed to going directly to storage devices 141-143. For example, firmware 135 may maintain a map (or other data structure) that is used to communicate to driver 111 information that is necessary to determine which I/O transactions must be diverted for further processing by firmware 135. Firmware 135 may dynamically update this map as conditions change.

In an embodiment, firmware 135 maintains the "map" (or list) of storage locations. This map indicates which storage locations are associated with I/O transactions that are to be processed by firmware 135 running on processor 134. Firmware 135 may communicate this map to driver 111 by storing the map in an area of memory that is shared, and thus accessible, by both host processor 110 and processor 134. For example, firmware 135 may write the map to an area of bus 120 shared memory.

When driver 111 receives an I/O transaction request, driver 111 can check the map to determine whether the I/O transaction is to be sent directly to one or more of storage devices 141-143, or whether the I/O transaction is to be sent to processor 134 for further processing by firmware 135. Firmware 135 may maintain and store this map is a bitmap table. Firmware 135 may maintain and store this map as a list of storage addresses and/or address ranges.

In an embodiment, the map may be maintained by hashing the logical block address (LBA), "chunk", and virtual disk index of I/O transaction requests into a bitmap. Driver 111 and firmware 135 would use the same hashing algorithm to read and write the bitmap.

An example of changes that would cause a firmware 135 to make changes to the map include when firmware 135 receives a write command to storage location stored in a writeback cache. The storage locations associated with this write cause firmware 135 to modify the map such that further accesses to these storage locations will not be sent directly to storage devices 141-143 without further processing by firmware 135. When the writeback data in the storage locations is cleared, firmware 135 would again modify the map to indicate that accesses to the storage locations may be sent directly to storage devices 141-143. When driver 111 issues a read, driver 111 checks the corresponding locations in the map. If there may be dirty data in the cache at the corresponding location(s), the map indicates that the I/O transaction request should be diverted for processing by firmware 135. If it has been established that there is not there dirty data in the cache at the corresponding location(s), the map indicates that the I/O transaction request may be sent directly to storage devices 141-143 (e.g., via path 250).

In an embodiment, firmware 135 maintains a list of JO ranges (i.e. virtual disk index, LBA, count) where I/O transactions from host processor 110 which fall in a range in the list must be redirected to firmware 135 for further processing. Firmware 135 pushes the list to memory shared with driver 111. In an example, a method for publishing this list is to hash the LBA and virtual disk indexes into a global bitmap table. In an embodiment, it may be desirable not to use the whole direct LBA for the hash. The LBA range may be divided into chunks (i.e., a larger granularity than is provided by the direct LBA) such that for a given LBA range, the LBAs in that range would map to a smaller number (e.g., one or two) "chunks" that can be used as input to the hash algorithm. This global bitmap table is pushed to driver 111 (i.e. written to the shared memory or otherwise communicated to). Driver 111 and firmware 135 use the same hash algorithm. Firmware 135 updates the driver 111 resident bitmap as the list extents require diversion changes.

An example of when the bitmap would change is when firmware 135 receives a write command to an area of writeback cache. The LBA/Count range for that write cause firmware 135 to set the corresponding bits in the bitmap. When the writeback data is cleared, firmware 135 clears the corresponding bits in the table. Whenever the bitmap changes, firmware 135 "pushes" updates to the bitmap in the (shared) driver 111 memory space.

When driver 111 is ready to issue a read, driver 111 checks the associated bits in the bitmap. If a bit is set, then that means the I/O transaction must be diverted for further processing by firmware 135 because there might be dirty data in the cache. This dirty data should be used to satisfy the read request. If the bit is not set, the I/O transaction can go directly to storage devices 141-143 without further processing by firmware 135.

Figure 3:
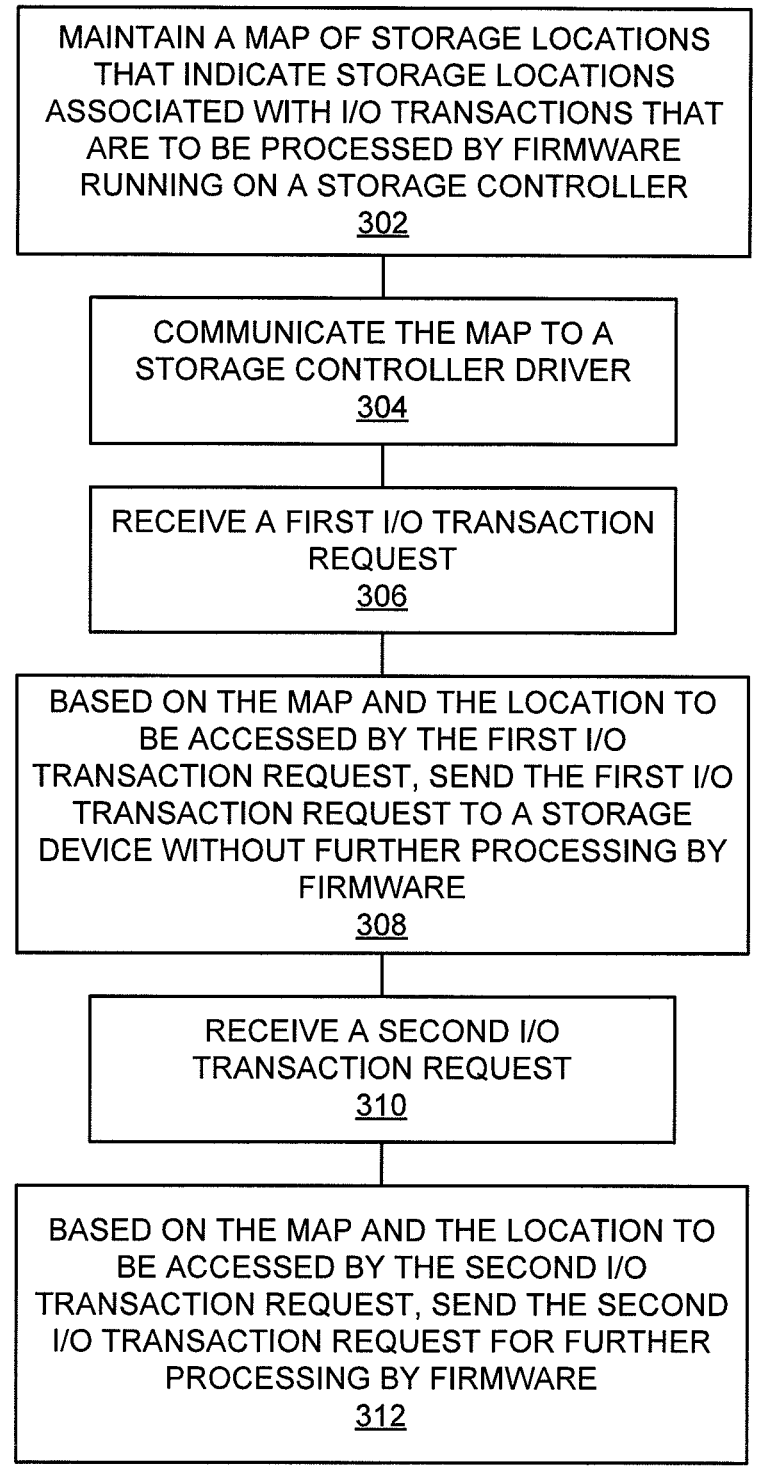
FIG. 3 is a flowchart illustrating a method of operating a storage system.

FIG. 3 is a flowchart illustrating a method of operating a storage system. The steps illustrated in FIG. 3 may be performed by one or more elements of storage system 100. A map of storage locations that indicates which storage locations associated with I/O transactions are to be processed by firmware running on a storage controller is maintained (302). For example, storage controller 130 may maintain a map of storage location which can or cannot be sent directly to storage device 141-143. The map is communicated to a storage controller driver (304). For example, storage controller 130 may write the map to memory shared with driver 111.

A first I/O transaction request is received (306). For example, driver 111 may receive an I/O transaction request. This first I/O transaction request may be associated with a storage location that does not require further processing by firmware 135. Based on the map and the location to be accessed by the first I/O transaction request, the first I/O transaction request is sent to a storage device without further processing by firmware (308). For example, based on the map in shared memory, driver 111 may configure storage controller 130 to send the first I/O transaction request directly to storage devices 141-143 without processing by firmware 135.

A second I/O transaction request is received (310). For example, driver 111 may receive an I/O transaction request that is associated with a storage location that requires further processing by firmware 135. Based on the map and the location to be accessed by the second I/O transaction request, the second I/O transaction request is sent for further processing by firmware (312). For example, based on the map in shared memory, driver 111 may configure storage controller 130 to send the second I/O transaction request to processor 134 for further processing by firmware 135.

The methods, systems, networks, devices, equipment, and functions described above may be implemented with or executed by one or more computer systems. The methods described above may also be stored on a computer readable medium. Elements of storage system 100, may be, comprise, include, or be included in, computers systems. This includes, but is not limited to host processor 110, processor 134, and storage devices 141-143.

Figure 4:
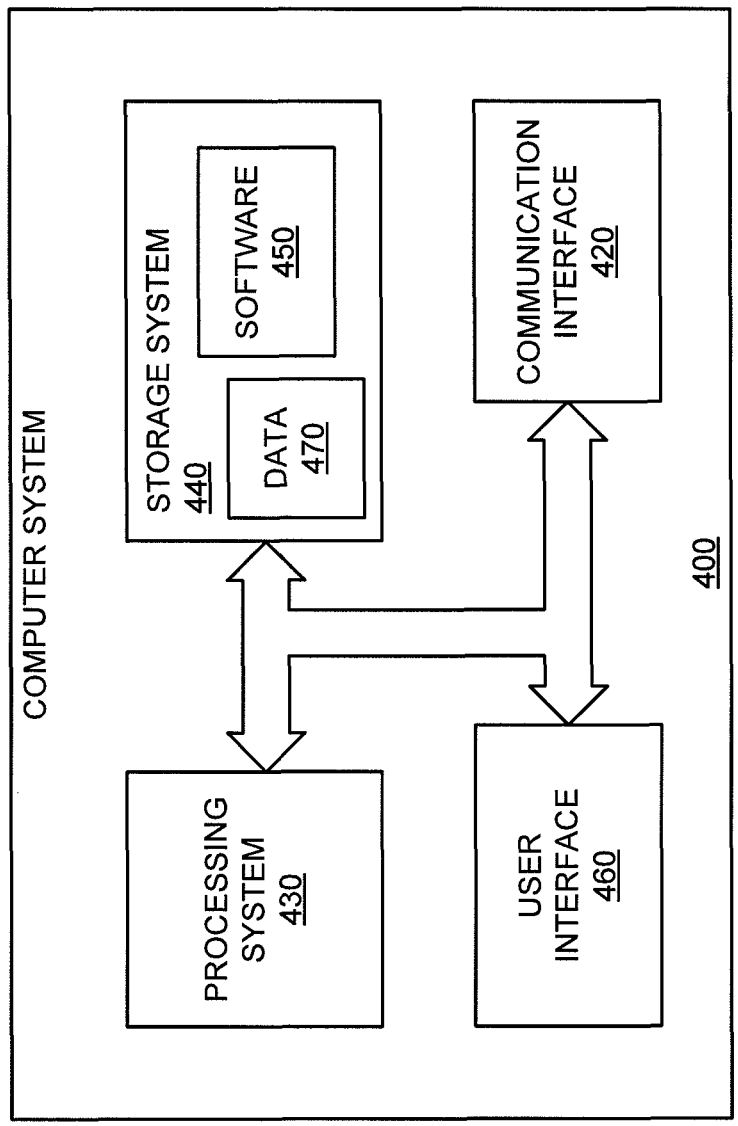
FIG. 4 is a block diagram of a computer system.

FIG. 4 illustrates a block diagram of a computer system. Computer system 400 includes communication interface 420, processing system 430, storage system 440, and user interface 460. Processing system 430 is operatively coupled to storage system 440. Storage system 440 stores software 450 and data 470. Processing system 430 is operatively coupled to communication interface 420 and user interface 460. Computer system 400 may comprise a programmed general-purpose computer. Computer system 400 may include a microprocessor. Computer system 400 may comprise programmable or special purpose circuitry. Computer system 400 may be distributed among multiple devices, processors, storage, and/or interfaces that together comprise elements 420-470.

Communication interface 420 may comprise a network interface, modem, port, bus, link, transceiver, or other communication device. Communication interface 420 may be distributed among multiple communication devices. Processing system 430 may comprise a microprocessor, microcontroller, logic circuit, or other processing device. Processing system 430 may be distributed among multiple processing devices. User interface 460 may comprise a keyboard, mouse, voice recognition interface, microphone and speakers, graphical display, touch screen, or other type of user interface device. User interface 460 may be distributed among multiple interface devices. Storage system 440 may comprise a disk, tape, integrated circuit, RAM, ROM, network storage, server, or other memory function. Storage system 440 may be a computer readable medium. Storage system 440 may be distributed among multiple memory devices.

Processing system 430 retrieves and executes software 450 from storage system 440. Processing system 430 may retrieve and store data 470. Processing system 430 may also retrieve and store data via communication interface 420. Processing system 430 may create or modify software 450 or data 470 to achieve a tangible result. Processing system 430 may control communication interface 420 or user interface 460 to achieve a tangible result. Processing system 430 may retrieve and execute remotely stored software via communication interface 420.

Software 450 and remotely stored software may comprise an operating system, utilities, drivers, networking software, and other software typically executed by a computer system. Software 450 may comprise an application program, applet, firmware, or other form of machine-readable processing instructions typically executed by a computer system. When executed by processing system 430, software 450 or remotely stored software may direct computer system 400 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of operating a storage system, comprising:
   maintaining a map of storage locations that indicates a plurality of storage locations associated with I/O transactions that are to be processed by firmware running on a storage controller;
   communicating the map to a storage controller driver;
   receiving, by the storage controller driver, a first I/O transaction request; and,
   based on the map and a first storage location to be accessed by the first I/O transaction request, sending the first I/O transaction request to a storage device without further processing by the firmware running on the storage controller.

2. The method of claim 1, further comprising:
   receiving, by the storage controller driver, a second I/O transaction request; and,
   based on the map and a second storage location to be accessed by the the second I/O transaction request, sending the second I/O transaction request for further processing by the firmware running on the storage controller.

3. The method of claim 1, wherein the map is stored in memory shared by the storage controller driver and the firmware running on the storage controller.

4. The method of claim 1 wherein maintaining the map of storage locations comprises:
   creating a hash key based on a logical block address (LBA) associated with the plurality of storage locations associated I/O transactions that are to be processed by firmware running on the storage controller.

5. The method of claim 1 wherein maintaining the map of storage locations comprises:
   creating a hash key based on a logical block address (LBA) associated with a plurality of storage locations associated I/O transactions that are not to be processed by firmware running on the storage controller.

6. The method of claim 1, wherein the map is stored as a bitmap table.

7. The method of claim 1, wherein the map is stored as a list.

8. A storage system comprising:
   a storage controller coupled to the host system to receive storage I/O requests, the storage controller configured to maintain a map of storage locations, the map indicating a plurality of storage locations associated with I/O transactions that are to be processed by firmware running on the a storage controller;
   shared memory configured to communicate the map to the storage controller driver; and, a storage controller driver running on a host system, the storage controller driver configured to receive a first I/O transaction request, and, based on the map and a first storage location associated with the first I/O transaction request, send the first I/O transaction request to a storage device without further processing by the firmware running on the storage controller.

9. The storage system of claim 8, wherein the storage controller is further configured to:

receive a second I/O transaction request and, based on the map and a second storage location associated with the second I/O transaction request, send the second I/O transaction request for further processing by the firmware running on the storage controller.

10. The storage system of claim 8, wherein the map is stored in the shared memory.

11. The storage system of claim 8, wherein the map of storage locations is indexed by a hash key based on a logical block address (LBA) associated with the plurality of storage locations associated I/O transactions that are to be processed by firmware running on the storage controller.

12. The storage system of claim 8, wherein the map of storage locations is indexed by a hash key based on a logical block address (LBA) associated with the plurality of storage locations associated I/O transactions that are not to be processed by firmware running on the storage controller.

13. The storage system of claim 8, wherein the map is stored as a bitmap table.

14. The storage system of claim 8, wherein the map is stored as a list.

15. A non-transitory computer readable medium having instructions stored thereon for operating a storage system that, when executed by a computer, at least instruct the computer to:

maintain a map of storage locations that indicates a plurality of storage locations associated with I/O transactions that are to be processed by firmware running on a storage controller;

communicate the map to a storage controller driver;

receive, by the storage controller driver, a first I/O transaction request; and, based on the map and a first storage location associated with the first I/O transaction request, send the first I/O transaction request to a storage device without further processing by the firmware running on the storage controller.

16. The medium of claim 15, wherein the computer is further instructed to:

receive, by the storage controller driver, a second I/O transaction request; and, based on the map and a second storage location associated with the second I/O transaction request, send the second I/O transaction request for further processing by the firmware running on the storage controller.

17. The medium of claim 15, wherein the map is stored in memory shared by the storage controller driver and the firmware running on the storage controller.

18. The medium of claim 15, wherein maintaining the map of storage locations comprises:

creating a hash key based on a logical block address (LBA) associated with the plurality of storage locations associated I/O transactions that are to be processed by firmware running on the storage controller.

19. The medium of claim 15, wherein maintaining the map of storage locations comprises:

creating a hash key based on a logical block address (LBA) associated with a plurality of storage locations associated I/O transactions that are not to be processed by firmware running on the storage controller.

20. The medium of claim 15, wherein the map is stored as a bitmap table.

* * * * *